US008692876B2

(12) United States Patent
Genovesio et al.

(10) Patent No.: US 8,692,876 B2
(45) Date of Patent: Apr. 8, 2014

(54) METHOD AND APPARATUS FOR IMAGING OF FEATURES ON A SUBSTRATE (75) Inventors: Auguste Genovesio, Seoul (KR); Neil Emans, Pretoria (RS)

(73) Assignee: Institut Pasteur Korea, Sungnam Gyeonggi (KR)

( * ) Notice: Subject to any disclaimer, the term of this patent is extended or adjusted under 35 U.S.C. 154(b) by 445 days.

(21) Appl. No.: 13/002,912

(22) PCT Filed: Jul. 8, 2009

(86) PCT No.: PCT/EP2009/004951
§ 371 (c)(1),
(2), (4) Date: Mar. 23, 2011

(87) PCT Pub. No.: WO2010/006727
PCT Pub. Date: Jan. 21, 2010

(65) Prior Publication Data
US 2011/0175994 A1 Jul. 21, 2011

Related U.S. Application Data (60) Provisional application No. 61/135,025, filed on Jul. 15, 2008.

(51) Int. Cl.
*H04N 7/18* (2006.01)
(52) U.S. Cl.
USPC ............................................ 348/79; 382/287

(58) Field of Classification Search
USPC ...................................... 348/79; 382/129, 287
See application file for complete search history.

(56) References Cited

U.S. PATENT DOCUMENTS

| 6,990,221 | B2 * | 1/2006 | Shams .......................... 382/129 |
|---|---|---|---|
| 2004/0223661 | A1 * | 11/2004 | Kraft ............................. 382/287 |
| 2006/0041384 | A1 * | 2/2006 | Kermani et al. ................ 702/19 |
| 2007/0021860 | A1 * | 1/2007 | Gertrudus Simons et al. ............................ 700/121 |
| 2008/0144899 | A1 * | 6/2008 | Varma et al. .................. 382/129 |
| 2009/0104474 | A1 * | 4/2009 | Schwartz et al. ............. 428/704 |
| 2009/0149346 | A1 * | 6/2009 | Monforte ........................ 506/16 |

OTHER PUBLICATIONS

Bajcsy, "Gridline: Automatic Grid Alignment in DNA Microarray Scans" *IEEE Transactions on Image Processing*, Jan. 2004, vol. 13, No. 1, pp. 15-25.

* cited by examiner

*Primary Examiner* — Christopher S Kelley
*Assistant Examiner* — Deirdre Beasley
(74) *Attorney, Agent, or Firm* — Saliwanchik, Lloyd & Eisenschenk (57) ABSTRACT

A method for imaging features on a substrate, comprising scanning the substrate and producing an image thereof, overlaying a grid model on the image, fitting the grid model to the locations of at least some of the features on the image, and extracting images of the features.

14 Claims, 6 Drawing Sheets

METHOD AND APPARATUS FOR IMAGING OF FEATURES ON A SUBSTRATE

CROSS REFERENCE TO A RELATED APPLICATION

This application is a National Stage Application of International Application Number PCT/EP2009/004951, filed Jul. 8, 2009; which claims the benefit of U.S. Provisional Application Ser. No. 61/135,025, filed Jul. 15, 2008; which are incorporated herein by reference in their entirety.

FIELD OF THE INVENTION

The present invention relates to a method and an apparatus for the imaging of features on a substrate and in particular to a method and an apparatus for the imaging of spots on a micro array.

BACKGROUND

The imaging and analysis of features on a substrate is an important task in various technical applications. For example in biochemical analysis it is a common technique to apply small spots of a carrier substance on a substrate according to a predefined pattern. Subsequently, small quantities of different cell materials are added to the spots of the carrier substance and cell growth of the different spots is monitored as a function of time by taking images of the spots on the substrate after certain periods of time and by analyzing features within the images.

The imaging of the features can be facilitated by arranging them on the substrate according to a predefined pattern. Usually, dedicated scanner hardware is used to perform the scanning and the substrate is scanned only at the predefined known positions of the spots registered during the preparation of the substrate in annotation files. This common technique is limited in several aspects.

Depending on the number of features on the substrate the scanning of the entire substrate requires a large number of single scans involving a corresponding large number of repeated and very precise mechanic displacements performed by the scanning apparatus for moving the substrate in front of the scanner or the scanner relative to the substrate. In biochemical applications substrates may contain more than 3888 features on a single substrate requiring a corresponding number of mechanical displacement steps. Accordingly, the scanning requires a highly precise and correspondingly expensive hardware.

Furthermore, the scanning process depends strongly on the precise information about the position of the spots on the substrate. The scanning may fail in case of a lack of precise positioning data or in case of a misalignment between the scanner and the substrate.

In view of these shortcomings, there is a need for an improved method and a corresponding apparatus that allows a faster imaging of features on a substrate and a reduction of the demands on the imaging hardware, in particular, in cases of substrates containing a large number of features.

SUMMARY OF THE INVENTION

It is the object of the present invention to provide an improved method and an apparatus for imaging features including a facilitated scanning process and accelerated imaging. This object is achieved by a method comprising the features of independent claim 1 and an apparatus comprising the features of independent claim 12.

Preferred embodiments of the invention are defined in the dependent claims.

The inventive method for imaging features on a substrate comprises scanning the substrate and producing an image thereof, overlaying a grid model on the image, fitting the grid model to the locations of at least some of the features on the image and extracting images of the features.

The inventive method allows for an independent scanning of the substrate in a single or several scanning steps irrespective of the locations of the features, while the locations of the features are identified by using a grid model that is placed on the image. The grid model is preferably a set of points connected by edges, wherein each point of the grid model is assigned a feature on the substrate, i.e. the number of points of the grid model equals the number of relevant features on the substrate. When overlaying the grid model on the scanned image the locations of the points of the grid model initially do not correspond to the actual locations of the features on the substrate. A subsequent fitting of the grid model to the locations of the features on the image allows for the precise determination of their locations and for the extraction of partial images of the features at and around the identified locations for further analysis.

Due to the fitting of the grid model to the features of the image a scanning process that includes repeated scanning steps is not necessary. Hence, the demands to the scanner are reduced. Furthermore, the time for the entire imaging process is reduced, since time consumed during repeated displacement steps of the scanner can be avoided.

According to an embodiment, the grid model is based on a pattern of the locations of the features on the substrate which are known a priori. When creating the grid model for a specific substrate this pattern including the distances between the features or additional information about their mutual orientation is used to define the initial positions of the points of the grid model and to establish the edges between corresponding points to define a neighborhood of a point.

According to another embodiment the grid model is based on a grid of the group comprising a regular grid, a rectilinear grid, a Cartesian grid, a polygonal grid, and a hexagonal grid.

Regular, rectilinear and Cartesian grids represent a tesselation of the substrate plane by congruent or incongruent rectangles or by unit squares, respectively. The points of the grid model are placed on the nodes of the tesselation. The patterns of the locations of the features may also be represented by a polygonal or a hexagonal grid which describes a tiling of the plane by polygons or hexagons. The points of the grid model are placed on the corresponding nodes of the grid.

According to another embodiment of the invention the overlaying comprises determining locations of some of the features of the substrate by a rough approximation and overlaying some of the points of the grid model on the locations. This can be done for example by identifying three prominent points such as boundary points or corners of the areas of features on the image of the substrate and by aligning the corresponding corners of the grid model with them. Any method, like an affine transformation, can be used to adapt the rest of the points of the grid model. This overlaying defines the initial configuration for further steps.

According to yet another embodiment it may also be of advantage to treat the image of the substrate, in particular, if multiple images have been produced during the scanning procedure. In particular their size may be reduced before the fitting of the grid model. The size reduction, on the one hand, speeds up further processing steps due to the reduced amount of data that needs to be processed and, on the other hand, a size reduction corresponds to a Gaussian smoothing of the image and therefore reduces noise in the image.

In another embodiment the image is further processed before the fitting of the grid model comprising one or several of the processes of an application of filters, smoothing, edge enhancement, color adaptation, and the like. A utilization of one or several of these methods helps to further distinguish the feature characteristics in the image, for example smoothing could be used to reduce the noise in the image, or edge enhancement could be used to emphasize the borders and the texture of the features. Selective color enhancement could be applied to enhance the contrast of a feature that has specific color characteristics.

According to a further embodiment the fitting may comprise an iterative optimization of the result of an energy functional of the grid model. The energy functional is a function of the points of the grid model and represents the current topology of the points. In addition, the energy functional also describes the deviation of the points of the grid model from the locations of the features on the image. The global energy, i.e. the result of the energy functional, is optimized by moving a point of the grid model to a location in its given neighborhood which optimizes the global energy. This process is iterated for each point of the grid model to determine the next optimal global energy. This is repeated until the result of the energy functional remains optimal and cannot be further improved. Other methods for iterative refinement can be applied as well.

In a preferred embodiment the result of the energy functional is minimized and said energy functional is defined as $E(P)=\alpha F(P)+\beta G(P)+\gamma H(P)$, where $\alpha$, $\beta$ and $\gamma$ are weighting factors, $F(P)$ is the distance term determined by the distance between adjacent points of the grid model, $G(P)$ is the perpendicularity term of the grid model and $H(P)$ is the curvature term determined by the deviation of the points of the grid model from the locations of the features computed from the curvature map of the image.

The corresponding terms are given as:

$$F(P) = \sum_{p_{i,j}} f(p_{i,j}, p_{i-1,j}) + f(p_{i,j}, p_{i+1,j}) + f(p_{i,j}, p_{i,j-1}) + f(p_{i,j}, p_{i,j+1}) \text{ with}$$

$$f(p, q) = (D_{interspot} - d(p, q))^2,$$

$$G(P) = \sum_{p_{i,j}} g(\overrightarrow{p_{i,j}p_{i-1,j}}, \overrightarrow{p_{i,j}p_{i,j-1}}) + g(\overrightarrow{p_{i,j}p_{i,j-1}}, \overrightarrow{p_{i,j}p_{i+1,j}}) +$$

$$g(\overrightarrow{p_{i,j}p_{i+1,j}}, \overrightarrow{p_{i,j}p_{i,j+1}}) + g(\overrightarrow{p_{i,j}p_{i,j+1}}, \overrightarrow{p_{i,j}p_{i-1,j}}) \text{ with}$$

$$g(\vec{u}, \vec{v}) = \left| \frac{\vec{u} \cdot \vec{v}}{\|\vec{u}\|\|\vec{v}\|} \right|, \text{ and}$$

$$H(P) = -\sum_{p_{i,j}} \text{curv}(I_\sigma(p_{i,j})).$$

In particular, the terms $F(P)$ and $G(P)$ represent the spatial configuration of the grid model and ensure that the points of the grid model will approximate a Cartesian grid. In particular, $F(P)$ has a higher value when the interspot distance deviates from the known distance. $G(P)$ has higher values when the angle between two neighboring points deviate from 90 degrees. Beside the spatial properties, $H(P)$ is used to create the link between the points of the grid model to the feature locations. $H(P)$ is derived from the curvature map of the image of the substrate as will be described below and has higher values when the points are far from a feature location.

According to an embodiment, the fitting of the grid model to the locations of at least some of the features comprises fitting the points of the grid model to the center of the features. Here the points of the grid model are optimized in such that they mark the center of each feature after the fitting procedure.

A preferred embodiment comprises that the features are spots on a micro array.

According to a further embodiment, the micro array comprises results of a growth of siRNA transfected cells. In this embodiment the substrate includes the micro array and the features include the spots on the micro array, each spot having the results of growth of siRNA transfected cells.

The invention also includes an apparatus. The inventive imaging apparatus comprises an image acquisition device adapted to scan a substrate of features and to produce at least a partial image thereof, and an analysis device to identify locations of the features on the image adapted to overlay a grid model on the image, fit the grid model to the locations of at least some of the features and extract images of the features.

The image acquisition device of the invention is adapted to scan a substrate irrespective of the position of the features located on it. The scanning may be performed so that it results in one or multiple images of the substrate. The image data are stored in a data base or immediately used by the analysis device to identify the locations of the features on the image. In order to do so, the analysis device uses a grid model which is overlaid on the image including one or several scanned images and fitted to the locations of the features. Based on the final position of the points of the grid model the analysis device extracts partial images of the features.

According to an embodiment of the apparatus, the features on the substrate are arranged according to a pattern, the pattern being a grid of the group comprising a regular grid, a rectilinear grid, a Cartesian grid, a polygonal grid and a hexagonal grid. The choice of a specific arrangement of the features may favor the process of analysis of the features on the image and the fitting of the grid model.

In an embodiment the substrate is a micro array. The micro array may comprise spots of one or several nucleic acids, or may be a cellular micro array. According to an embodiment the image acquisition device is adapted to produce the image with sub-cellular resolution.

According to a further embodiment, the apparatus further comprises a printer to generate the features on a substrate and annotation files containing the locations of the features. The annotation files describe the topology of the features and can therefore be used to define the initial pattern of the grid model and to provide the necessary data and information.

According to still another embodiment of the apparatus, the printer generates spots and on each spot a nucleic acid from a library or a compound from a library is applied including an RNAi library, an siRNA library or a compound library/cDNA library, such that the micro array represents an entire library or a subset thereof. In this embodiment the imaging apparatus scans the micro array containing spots, identifies the locations of the spots on the corresponding images and extracts the images of the spots for further analysis.

Further features, advantages and characteristics of the invention will become apparent from the following detailed description of an exemplifying embodiment of the invention in combination with the accompanying drawings.

DETAILED DESCRIPTION

Figure 1:
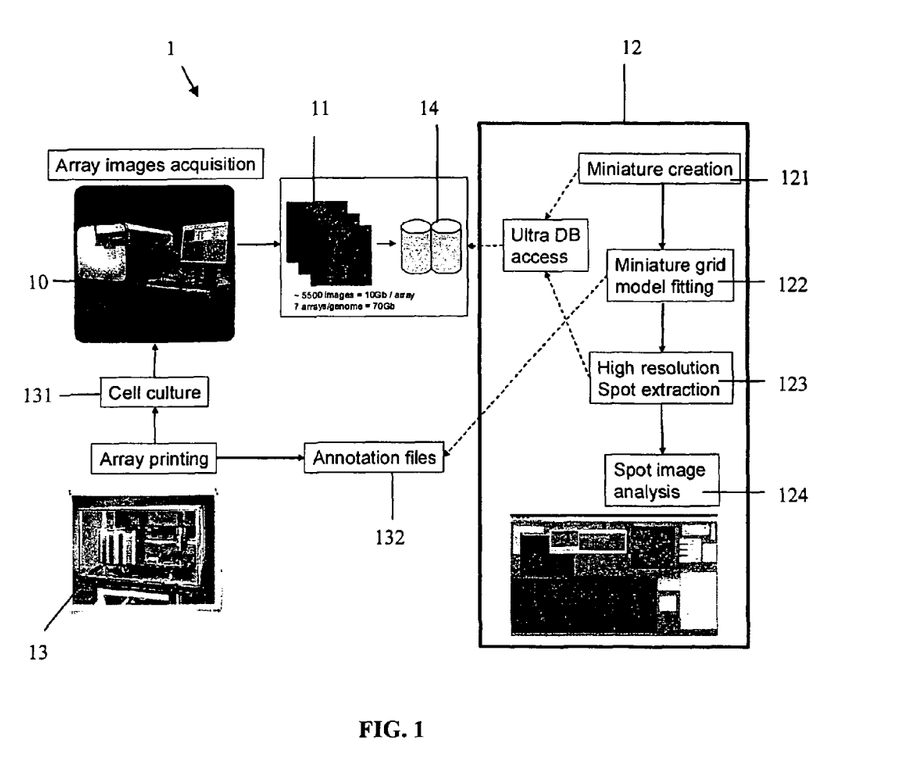
FIG. 1 schematically shows an embodiment of the imaging apparatus according to the present invention.

FIG. 1 shows an embodiment of an imaging apparatus 1 according to the present invention comprising an image acquisition device 10 for producing images of a substrate 11, an analysis device 12, a printer 13 and a data base 14.

The substrate 131 containing a large quantity of features is scanned with the image acquisition device 10 irrespective of the position of the features resulting in a single image or multiple partial images of the substrate 11.

For example, a scanning of a substrate 131 comprising a micro array with 3888 spots using a sub-cellular resolution may result in approximately 5500 grayscale images, or approximately 1800 rgb-images. In combination these images may represent the entire surface of the micro array. The images of the substrate 11 are stored in the data base 14 for further processing in the analysis device 12.

According to the embodiment as shown in FIG. 1 the analysis device 12 first accesses the data base 14 and reduces the resolution of the images (step 121 in FIG. 1) before a further processing of the images is performed. However, this step can be omitted. If multiple images of the substrate 11 have been produced by the image acquisition device 10, the analysis device 12 arranges and combines the images to form a single image of the entire surface of the substrate 131.

In a next step the analysis device 12 fits a grid model to the locations of the features on the image of the substrate 11 (step 122 in FIG. 1). This fitting procedure that is described in greater detail below requires some knowledge of the topology of the features on the substrate 131 such as their size or relative location with respect to each other. This information can be stored, for example, in annotation files 132 that are created during the manufacturing of the substrate 131 or that can be determined subsequently by a suitable method known to those skilled in the art. Frequently, the features are arranged on the substrate 131 according to a pattern such as a regular grid, a rectilinear grid, a Cartesian grid, a polygonal grid, a hexagonal grid, etc.

After fitting the grid model (step 122 in FIG. 1), the images of the features are extracted (step 123 in FIG. 1) based on the information about their location obtained by the fitted grid model. If the image size has been reduced before fitting the grid model, the original images are retrieved from the data base 14 and used for the extraction of the feature images instead of the images with the reduced size. It has to be noted that a feature can be located on multiple images of the substrate 11 and therefore several images of the substrate 11 may be required to extract the image of the feature.

In a subsequent step the extracted images of the features are analyzed (step 124 in FIG. 1), as will be described below. In the present embodiment the substrate 131 is generated by a printer 13, and the substrate 131 comprises a micro array, preferably a nucleic acid or cellular micro array comprising the encapsulation mixture. Cells are subsequently grown on the micro arrays and thus transfected by a nucleic acid on each spot location. The printer 13 also generates annotation files 132 which contain the coordinates of each spot. However, it is to be noted that this information is not used for creation of the images of the substrate 11 due to the size and the irregularity of the substrate 131 containing the cell growth. Yet, it is used to define the initial grid model for step 122 of fitting the grid model of the analysis device 12.

Figure 2A:
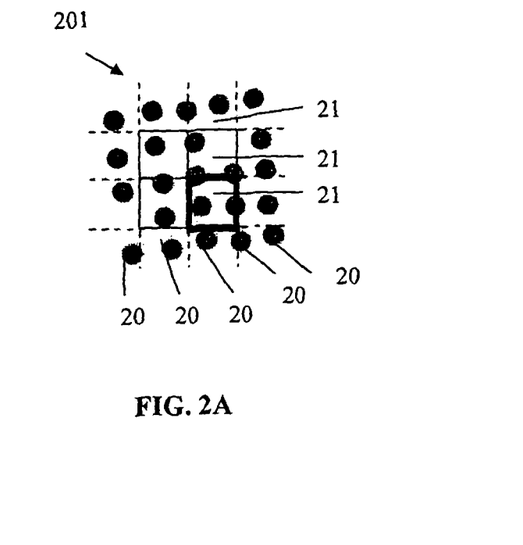
FIGS. 2a-2d display the steps and the results of the steps of an imaging method according to one embodiment of the present invention including a scanning of images of features on a substrate (FIG. 2a), single images of features obtained by the scanning (FIG. 2b), an overlaying of a Cartesian grid model on the images of the substrate (FIG. 2c), and a fitted Cartesian grid model (FIG. 2d)
Figure 2B:
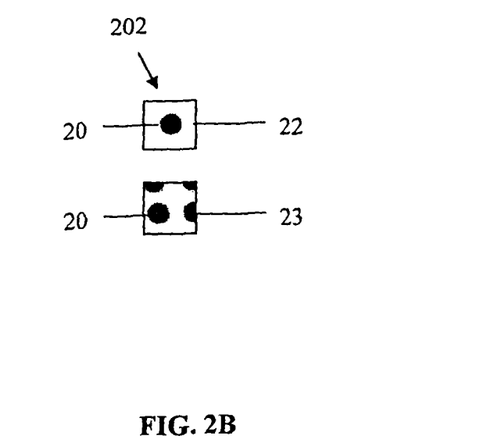

The previously mentioned method of identifying features on a substrate is explained on the basis of a particular embodiment shown in FIGS. 2a-2d. An image of features 201 on a substrate comprises the features 20 on a single image or on multiple images 21 that are arranged and combined to form an entire image of the substrate (FIG. 2a). Usually, a feature 20 will not be located exactly in the center of an image 22 as shown in FIG. 2b, but will more likely be closer to one of the edges or corners of the image 23 than to the others and may in certain cases be part of up to four adjacent images 21.

Figure 2C:
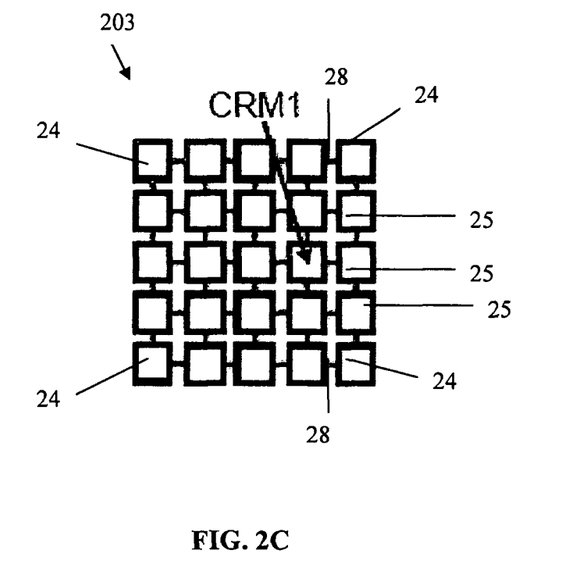

As shown in FIG. 2c, the image of features 201 is being overlaid by an initial grid model 203. In one embodiment, the initial grid model 203 comprises points 25 connected by edges 28. The points 25 of the initial grid model 203 and their neighborhood defined by edges 28 are based on the pattern of the locations of the features 20 on the substrate and may comprise any suitable pattern such as a regular grid, a rectilinear grid, a Cartesian grid (as shown in FIG. 2c) or polygonal grid like a hexagonal grid.

Figure 2D:
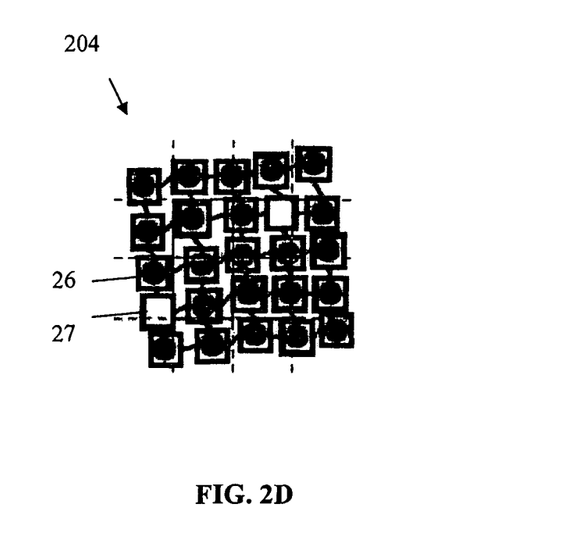

The initial grid model 203 is placed on the image of features 201 by a rough approximation of the locations of the features 20. The approximation may be done by any suitable technique. For example, three of the corner points 24 of the initial grid model 203 can be placed on the corresponding corners of the group of features 20 on the entire image of features 201. The placing of the initial grid model 203 on the image 201 can be done manually. However, an automatic procedure may also be used. The initial grid model 203 is then deformed by a suitable technique like an affine transformation including shearing. After the initial placement of the grid model 203, the points 25 of the initial grid model 203 are fitted to the locations of the features 20 resulting in a fitted grid model 204 as shown in FIG. 2d. After the fitting procedure each point 26 of the fitted grid model 204 indicates the precise location of a feature 20. Even if features 20 have been corrupted, or are missing, the corresponding points 27 of the fitted grid model 204 indicate the most likely position of the missing features.

The fitting of the points 25 of the initial grid model 203 to the locations of the features 20 can be done by any suitable technique including a statistical method or optimization method. Preferably, the fitting is done by an optimization of a result of an energy functional bound to the grid model.

Figure 3A:
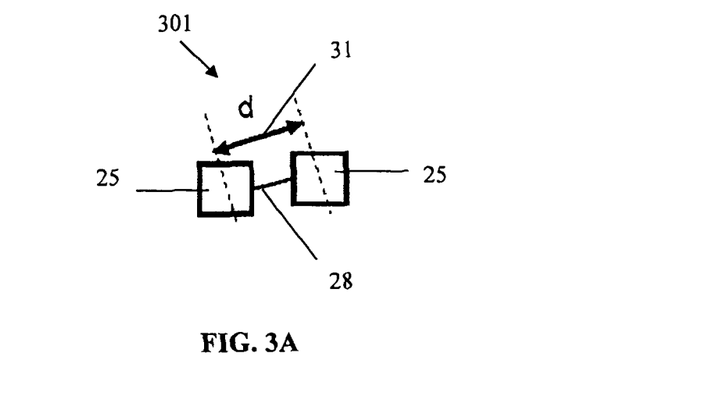
FIGS. 3a-3c depict terms of an energy functional of a grid model comprising the distance between two adjacent points (FIG. 3a), the perpendicularity between two adjacent points of the grid model (FIG. 3b) and a curvature map of an image (FIG. 3c) according to one embodiment of the present invention.
Figure 3B:
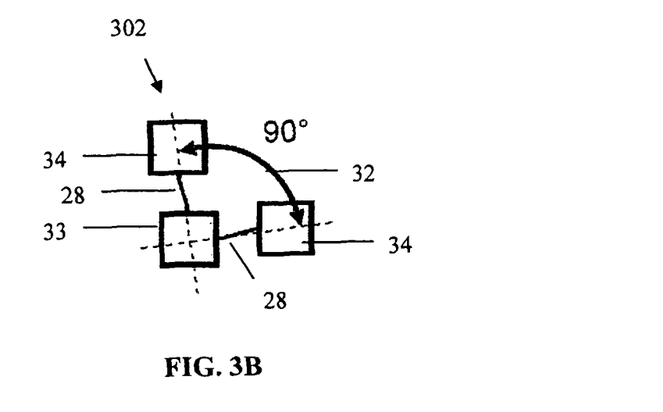
Figure 3C:
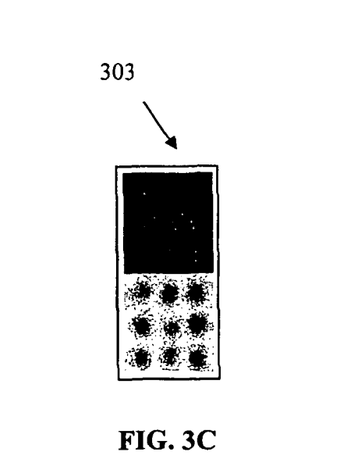

The energy functional can be minimized and defined as a weighted sum of three terms of the points 25 of the grid model 203, 204 representing the distance 31 between two adjacent points 25 as a distance term 301, the perpendicularity of the grid model 203, 204 as a perpendicularity term 302, and the characteristics of the image of features 201 in the neighborhood of a point 25 as a curvature term 303, as illustrated in FIGS. 3a-3c. The weighting factors of the terms of the weighted sum can be used to define the relative significance of each term with regard to the global energy, i.e. the result of the energy functional.

The initial value of the distance 31 between two points 25 is previously determined by the underlying pattern of features on the substrate and is given by the length of the edge 28 in its initial state as shown in FIG. 3a. For a Cartesian grid, for example, the distance 31 is the same for each pair of points 25 connected by an edge 28. A corresponding distance term 301 that can be used to define a part of the energy functional has higher values when the distance 31 between two points 25 deviates far from the initial value. Therefore, the minimization of the distance term 301 ensures that the points 25 keep close to the initial distance from each other.

The perpendicularity of the grid model 203, 204 is characterized by the angle 32 between two edges 28 connecting two adjacent points 34 of a point 33 as illustrated in FIG. 3b. For example, for a regular grid the initial value of the angle 32 is preferably 90 degrees. However, it can be of arbitrary value and is defined by the initial grid model 203. The corresponding perpendicularity term 302 of the energy functional has higher values when the angle 32 deviates far from the initial value. Similarly to the distance term 301, the minimization of the perpendicularity term 302 ensures that the points 25 stay close to a rectangular pattern in the fitted regular grid model 204.

The curvature term 303 of the energy functional in this embodiment is given by the neighborhood of a point 25 of the grid model 203, 204 projected on the image of features 201. In this embodiment the image of features 201 comprises a matrix of picture elements (pixels), each pixel having at least one color value, e.g. one value for grey scale images, or three values for rgb-images. The curvature term 303 is a function of the color values of the pixels of the image of features 201 in the neighborhood given by the current position of the point 25. The neighborhood is defined by a window of arbitrary size and shape. The window can be of rectangular size, as is the case in most convolution techniques used in image processing. In this particular embodiment the rectangular window size is depicted as a square around the points 25 of the grid model 203, 204 as shown in FIGS. 2c, 2d, 3a, and 3b. It is obvious that each size and form of the window, like a circular or elliptical size can be used instead. The curvature term 303 can for example be based on the computed curvature map shown in FIG. 3c which has higher values when a point 25 is far from a location of a feature 20.

The curvature map curv( ) is defined as the product of the Gaussian curvature of image $I_\sigma$ with the original image $I_\sigma$ point by point ($I_\sigma$ is the result of filtering image I with a Gaussian Kernel of size σ). The function curv( ) tends to produce a map where spot-like objects of a given size are emphasized. The Gaussian curvature of a two dimensional surface at a point is the determinant of the Hessian matrix at this point (the Hessian matrix being the matrix of second derivatives). This positive value is high only in cases where the considered point forms a cap or a cup. When multiplied by the original image value at this point, a cup will then produce a low value on the map while a cap will produce a high value. Therefore, the minimization of the negative curvature term 303 ensures that all (sum of for all locations) the points 25 move towards the locations of the features 20 on the image of features 201.

The energy functional can be given as $E(P)=\alpha F(P)+\beta P(P)+\gamma H(P)$, where α, β and γ are weighting factors and $P=(p_{1,1}, p_{1,2},\ldots,p_{n,m})$ are the points 25 of the grid model 203, 204 and the corresponding terms are given as $$F(P) = \sum_{p_{i,j}} f(p_{i,j},\ p_{i-1,j}) + f(p_{i,j},\ p_{i+1,j}) + f(p_{i,j},\ p_{i,j-1}) + f(p_{i,j},\ p_{i,j+1})$$

as the distance term 301 with $f(p,q)=(D_{interspot}-d(p,q))^2$, where $D_{interspot}$ is the initial value of the distance 31 and $d(p,q)$ represents the current distance 31 of two points p and q 25 connected by an edge 28, and $$G(P) = \sum_{p_{i,j}} g(\overrightarrow{p_{i,j}p_{i-1,j}},\ \overrightarrow{p_{i,j}p_{i,j-1}}) + g(\overrightarrow{p_{i,j}p_{i,j-1}},\ \overrightarrow{p_{i,j}p_{i+1,j}}) +$$
$$g(\overrightarrow{p_{i,j}p_{i+1,j}},\ \overrightarrow{p_{i,j}p_{i,j+1}}) + g(\overrightarrow{p_{i,j}p_{i,j+1}},\ \overrightarrow{p_{i,j}p_{i-1,j}})$$

as the perpendicularity term 302 with $$g(\vec{u},\vec{v}) = \left|\frac{\vec{u}\cdot\vec{v}}{|\vec{u}||\vec{v}|}\right|, \text{ and}$$

$$H(P) = -\sum_{p_{i,j}} \text{curv}(I_\sigma(p_{i,j}))$$

as the curvature term 303 based on the curvature map described above.

Figure 4A:
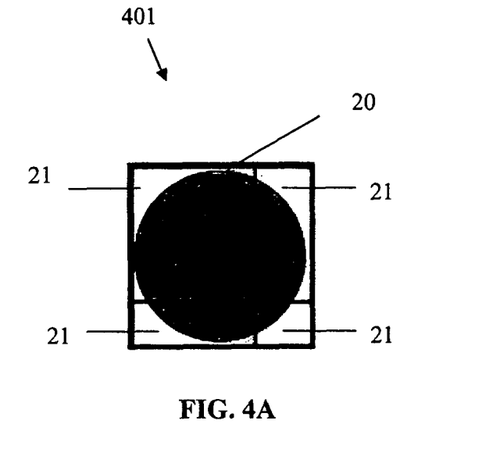
FIGS. 4a and 4b display an extracted rectangular image of a feature using coordinates obtained by the fitting procedure (FIG. 4a) and a grid model fitted to a large micro array showing missing spot detection and grid overlay onto red siRNA spot images (FIG. 4b) according to one embodiment of the present invention.

After the fitting of the grid model 204, the coordinates of each point 25 are used to extract an image of the feature 401 as shown in FIG. 4a. As mentioned previously, the feature 20 may be located on up to four adjacent images 21. In a particular embodiment this can be a high resolution composite spot image generated from adjacent high resolution images using coordinates from fitting the grid model 204 on the image of reduced resolution.

Figure 4B:
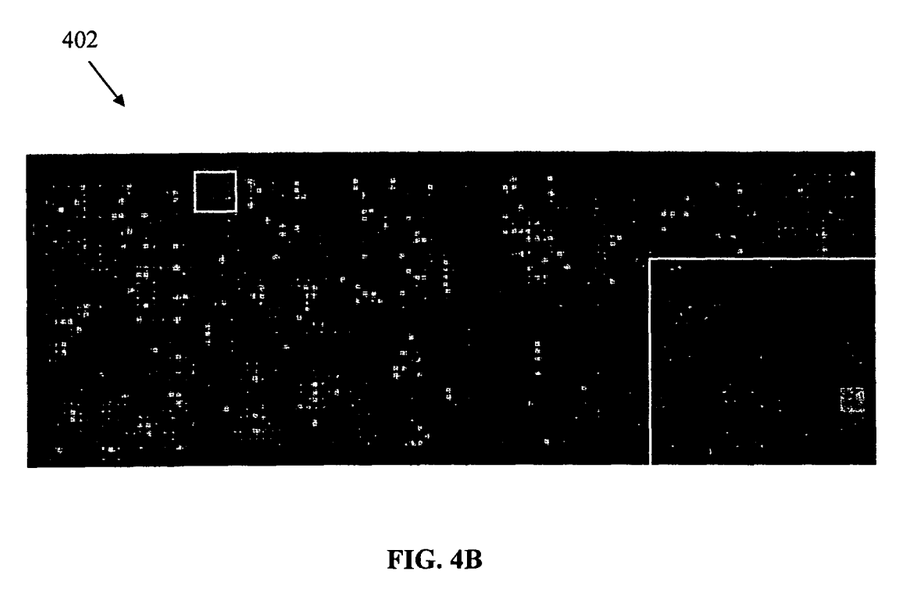

FIG. 4b shows the result of a particular embodiment comprising a fitted grid model 204 on a large micro array showing missing spot detection 27 as well as a grid overlay onto red siRNA spot images, as shown in the inset. The unprinted spots can be automatically detected and excluded from any further analysis the following way. The neighborhood at the theoretical location of each spot given by the points 25 of the fitted grid model 204 should show a picture with a relatively strong spot intensity and curvature for a correctly printed spot. Therefore, a picture showing an intensity and curvature lower than the normal distribution over the array is considered as a non printed spot and removed.

Images derived from a micro array comprising siRNA spots can be used. An example of such an image derived from the spot channel is given in FIG. 5. The image contains four spots 50, 51, one of them being entirely on the image 50 and three of them being partially visible only 51.

Once the grid model 204 is fitted and the feature images 401 are extracted automatically one by one, they can be analyzed with further algorithms. This creates a flow of annotated images each with a single centered feature per image. For the analysis of spots on a micro array as disclosed in one embodiment of the invention this type of image is of advantage, because most image analysis algorithms in this application area have been specifically designed to analyze cells located on a single spot.

The described features and characteristics of the invention may be of importance for the invention in any combination.

Figure 5:
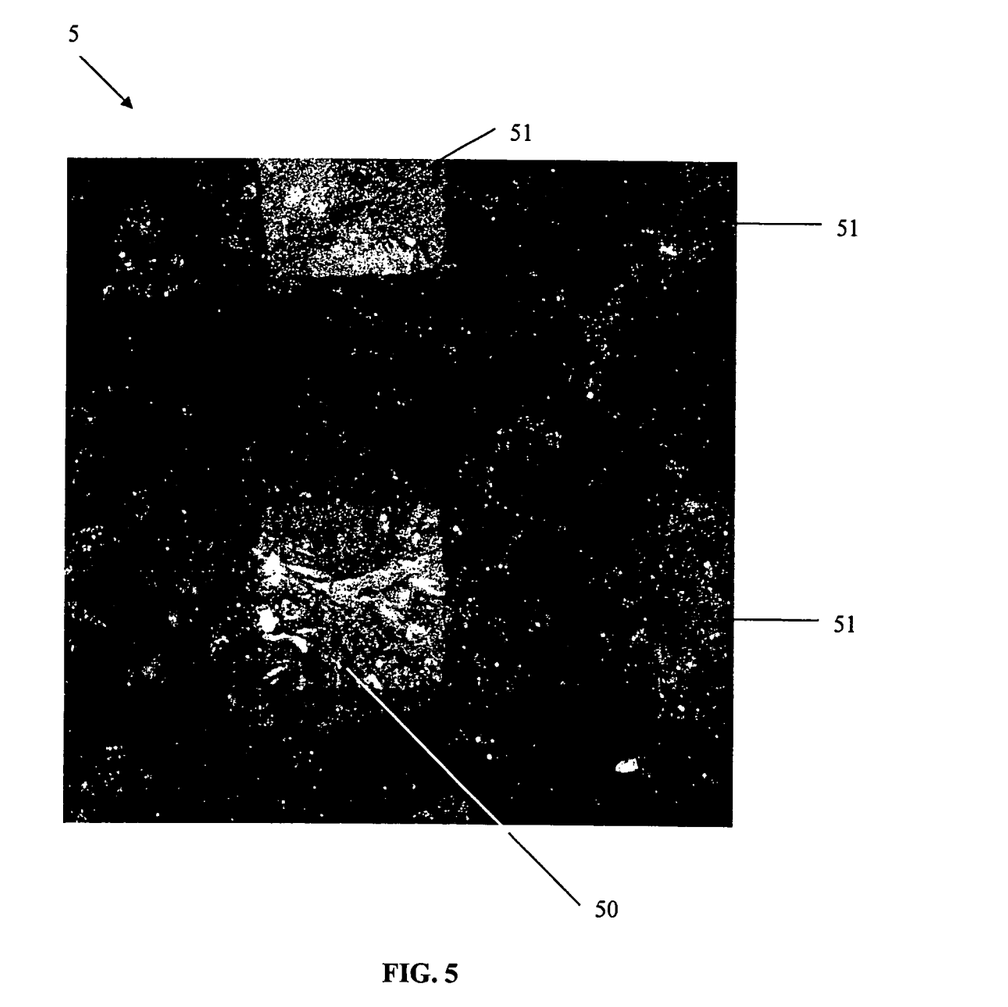
FIG. 5 shows an image of the spot channel produced by the image acquisition device of the imaging apparatus according to one embodiment of the present invention, wherein the substrate is a micro array comprising spots of siRNA transfected cells.

| | Reference signs | |
|---|---|---|
| 1 | imaging apparatus | FIG. 1 |
| 10 | image acquisition device | |
| 11 | image of the substrate | |
| 12 | analysis device | |
| 121 | step of reducing the image resolution | |
| 122 | step of fitting the grid model | |
| 123 | step of extracting the images of the features | |
| 124 | step of analyzing the extracted images of the features | |
| 13 | printer | |
| 131 | substrate | |
| 132 | annotation files | |
| 14 | data base | |
| 201 | image of features | FIG. 2 |
| 20 | feature | |
| 21 | image | |
| 202 | location of features on an image | |
| 22 | image having a feature at its centre | |
| 23 | image having multiple features | |
| 203 | initial grid model | |
| 24 | corner point | |
| 25 | point | |
| 28 | edge | |
| 204 | fitted grid model | |
| 26 | point fitted to a feature | |
| 27 | point fitted to a missing feature | |
| 301 | distance term | FIG. 3 |
| 31 | distance | |
| 302 | perpendicularity term | |
| 32 | angle | |
| 33 | point | |
| 34 | adjacent point | |
| 303 | curvature term | |
| 401 | extracted image of the feature | FIG. 4 |
| 402 | fitted grid model | |
| 5 | partial image of a micro array comprising spots | FIG. 5 |
| 50 | spot | |
| 51 | partial spot | |

The invention claimed is:

1. A method for imaging features on a substrate, comprising:
   scanning the substrate and producing an image thereof;
   overlaying a grid model on the image;
   fitting the grid model to the locations of at least some of the features on the image; and
   extracting images of the features,
   wherein the fitting comprises an iterative optimization of the result of an energy functional of the grid model, wherein the result of the energy functional is minimized, and said energy functional is defined as $$E(P) = \alpha F(P) + \beta G(P) + \gamma H(P)$$

where $\alpha$, $\beta$, and $\gamma$ are weighting factors, F(P) is a distance term determined by the distance between adjacent points of the grid model, G(P) is a perpendicularity term of the grid model, and H(P) is a curvature term determined by the deviation of the points of the grid model from the locations of the features computed from a curvature map of the image, and the corresponding terms are given as $$F(P) = \sum_{p_{i,j}} f(p_{i,j}, p_{i-1,j}) + f(p_{i,j}, p_{i+1,j}) + f(p_{i,j}, p_{i,j-1}) + f(p_{i,j}, p_{i,j+1}) \text{ with}$$

$$f(p, q) = (D_{interspot} - d(p, q))^2,$$

$$G(P) = \sum_{p_{i,j}} g(\overrightarrow{p_{i,j}p_{i-1,j}}, \overrightarrow{p_{i,j}p_{i,j-1}}) + g(\overrightarrow{p_{i,j}p_{i,j-1}}, \overrightarrow{p_{i,j}p_{i+1,j}}) +$$
   $$g(\overrightarrow{p_{i,j}p_{i+1,j}}, \overrightarrow{p_{i,j}p_{i,j+1}}) + g(\overrightarrow{p_{i,j}p_{i,j+1}}, \overrightarrow{p_{i,j}p_{i-1,j}}) \text{ with}$$

$$g(\vec{u}, \vec{v}) = \left| \frac{\vec{u} \cdot \vec{v}}{\|\vec{u}\|\|\vec{v}\|} \right|, \text{ and}$$

$$H(P) = -\sum_{p_{i,j}} \text{curv}(I_\sigma(p_{i,j})).$$

2. The method of claim 1, wherein the grid model is based on a pattern of the locations of the features on the substrate.

3. The method of claim 1, wherein the grid model is based on a grid of the group consisting of regular grids, rectilinear grids, Cartesian grids, polygonal grids, and hexagonal grids.

4. The method of claim 1, wherein the overlaying comprises determining locations of some of the features on the substrate by a rough approximation and overlaying some of the points of the grid model on the locations.

5. The method of claim 1, wherein the size of the image is reduced before the fitting of the grid model.

6. The method of claim 1, wherein the image is processed before the fitting of the grid model comprising at least one of an application of filters, smoothing, edge enhancement, and color adaptation.

7. The method of claim 1, wherein fitting the grid model to the locations of at least some of the features comprises fitting the points of the grid model to the centers of the features.

8. The method of claim 1, wherein the features are spots on a micro array.

9. The method of claim 8, wherein the micro array comprises results of a growth of siRNA transfected cells.

10. An imaging apparatus, comprising:
   an image acquisition device adapted to scan a substrate of features and to produce at least a partial image thereof; and
   an analysis device to identify locations of the features on the image adapted to overlay a grid model on the image; fit the grid model to the locations of at least some of the features; and extract images of the features,
   wherein the fitting comprises an iterative optimization of the result of an energy functional of the grid model, wherein the result of the energy functional is minimized, and said energy functional is defined as $$E(P) = \alpha F(P) + \beta G(P) + \gamma H(P)$$

where $\alpha$, $\beta$, and $\gamma$ are weighting factors, F(P) is a distance term determined by the distance between adjacent points of the grid model, G(P) is a perpendicularity term of the grid model, and H(P) is a curvature term determined by the deviation of the points of the grid model from the locations of the features computed from a curvature map of the image, and the corresponding terms are given as $$F(P) = \sum_{p_{i,j}} f(p_{i,j}, p_{i-1,j}) + f(p_{i,j}, p_{i+1,j}) + f(p_{i,j}, p_{i,j-1}) + f(p_{i,j}, p_{i,j+1}) \text{ with}$$

$$f(p, q) = (D_{interspot} - d(p, q))^2,$$

$$G(P) = \sum_{p_{i,j}} g\left(\overrightarrow{p_{i,j}p_{i-1,j}}, \overrightarrow{p_{i,j}p_{i,j-1}}\right) + g\left(\overrightarrow{p_{i,j}p_{i,j-1}}, \overrightarrow{p_{i,j}p_{i+1,j}}\right) +$$
$$g\left(\overrightarrow{p_{i,j}p_{i+1,j}}, \overrightarrow{p_{i,j}p_{i,j+1}}\right) + g\left(\overrightarrow{p_{i,j}p_{i,j+1}}, \overrightarrow{p_{i,j}p_{i-1,j}}\right) \text{ with}$$
$$g(\vec{u}, \vec{v}) = \left|\frac{\vec{u} \cdot \vec{v}}{\|\vec{u}\|\|\vec{v}\|}\right|, \text{ and}$$
$$H(P) = -\sum_{p_{i,j}} \text{curv}(I_\sigma(p_{i,j})).$$

11. The apparatus of claim 10, wherein the features on the substrate are arranged according to a pattern, the pattern being a grid of the group consisting of regular grids, rectilinear grids, Cartesian grids, polygonal grids, and hexagonal grids.

12. The apparatus of claim 10, wherein the substrate is a micro array comprising spots and wherein the image acquisition device is adapted to produce the image with subcellular resolution.

13. The apparatus of claim 12, further comprising a printer to generate the features on a substrate, and annotation files containing the locations of the features.

14. The apparatus of claim 13, wherein the printer generates spots, and on each spot, a nucleic acid from a library or a compound from a library is applied, said library comprising an RNAi library, an siRNA library, or a compound library/cDNA library, such that the micro array represents an entire library, a subset of a library or any combination thereof.

* * * * *

UNITED STATES PATENT AND TRADEMARK OFFICE
CERTIFICATE OF CORRECTION

PATENT NO.         : 8,692,876 B2
APPLICATION NO.    : 13/002912
DATED              : April 8, 2014
INVENTOR(S)        : Auguste Genovesio et al.

It is certified that error appears in the above-identified patent and that said Letters Patent is hereby corrected as shown below:

In the Specification:

Column 8,
Line 4, "+β(P)+" should read --+ $\beta G(P)$ +--.

Signed and Sealed this
Twenty-second Day of July, 2014

Michelle K. Lee
*Deputy Director of the United States Patent and Trademark Office*